Figure 1:
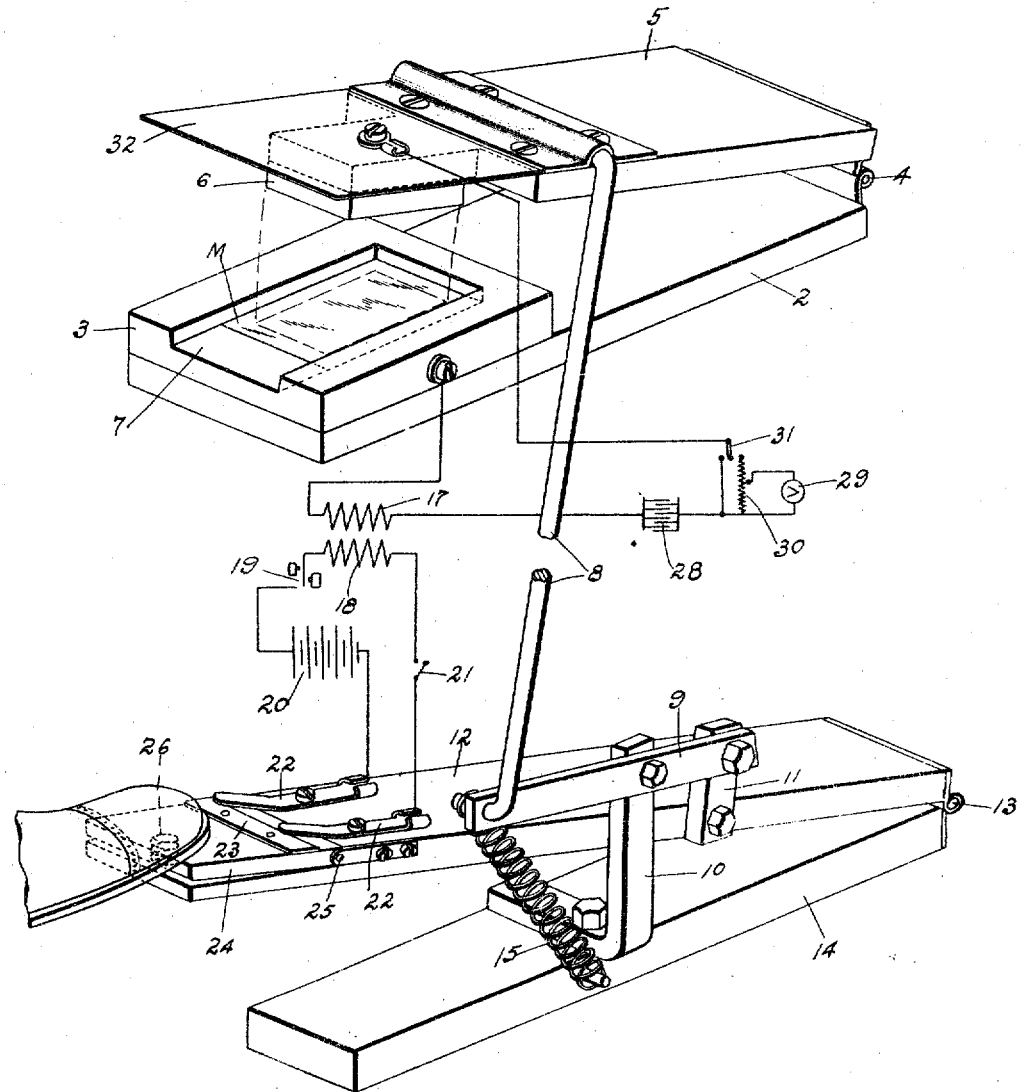

Sept. 2, 1924.

B. MACPHERSON 1,506,761

PROCESS AND APPARATUS FOR TESTING DIELECTRIC MATERIALS

Filed Sept. 2, 1920     2 Sheets-Sheet 2

Inventor.
Byron Macpherson
by
Philip Farnsworth Atty.

Patented Sept. 2, 1924.

1,506,761

UNITED STATES PATENT OFFICE.

BYRON MACPHERSON, OF ROXBURY, MASSACHUSETTS, ASSIGNOR TO WIRELESS SPECIALTY APPARATUS COMPANY, OF BOSTON, MASSACHUSETTS, A CORPORATION OF NEW YORK.

PROCESS AND APPARATUS FOR TESTING DIELECTRIC MATERIALS.

Application filed September 2, 1920. Serial No. 407,820.

*To all whom it may concern:*

Be it known that I, BYRON MACPHERSON, a citizen of the United States, residing at Roxbury, in the county of Suffolk and State of Massachusetts, have invented certain Improvements in Processes and Apparatus for Testing Dielectric Materials, of which the following description, in connection with the accompanying drawings, is a specification, like reference characters on the drawings indicating like parts in the several figures.

This invention relates to processes and apparatus for testing insulating and dielectric materials, and it is especially concerned with the testing of sheets of dielectric material to be used in making electrical condensers. The dielectric elements in the better grades of condensers usually are made of mica and the necessity for testing such materials arises particularly where mica is to be used. The invention, therefore, will be herein disclosed in connection with apparatus designed especially for testing the dielectric strength of sheets of mica, although it will readily be understood that this apparatus and the novel process provided by this invention are equally applicable to the testing of other dielectric materials.

The process of preparing mica elements for assembly with tin foil or other conducting elements to form a condenser includes the splitting of the mica into sheets of the required thickness and the dieing out or cutting of these sheets to the required shape and dimensions. These sheets of mica are very thin, usually about one one-thousandth of an inch in thickness, and since mica naturally is frail mechanically a very substantial percentage of these mica sheets contain a hole, flaw, or imperfection which renders them unfit for use in a condenser. If one of these defective elements is assembled in the condenser stack it will permit an electrical discharge through the hole or other flaw or imperfection and this discharge will short circuit, and therefore ruin, the entire condenser. It is impracticable to detect these flaws by a visual inspection and it has therefore been proposed heretofore to test these elements before they are assembled in the condenser stack by subjecting them to a dielectric strain considerably greater than that to which they are subjected in the condenser. Such a testing operation eliminates the imperfect elements before the assembling operation has been begun so that it can be definitely determined that only perfect mica elements shall go into the construction of the condenser.

The method of testing these elements heretofore practiced has usually consisted in bringing two testing terminals connected to a source of current of the required potential into engagement with the opposite faces of the mica sheet or films to be tested. If the sheets are imperfect an electrical discharge will occur through the flaw or imperfection, but if the sheet is perfect, then there either will be no discharge; or else, if the voltage is sufficiently high, a discharge will take place around the edges of the sheet. The presence or absence of this discharge indicates whether or not the mica sheet is perfect. I have found, however, that if a given number of mica sheets are tested in this manner, the imperfect sheets discarded and the perfect sheets again tested, that a substantial percentage of the sheets that successfully pass the first test will break down upon a second test. If this operation is repeated with the remaining sheets, an additional number will break down upon the third test; and if the testing of these sheets is continued, finally all of the sheets will be broken down. It is evident that this break-down is not due simply to the application of the testing potential, since sheets that successfully withstand a long continued application of the testing potential break down when tested in the manner above described. Consequently, it is clear that this testing operation does not determine accurately the dielectric strength of the elements tested, and that it imposes a strain on these elements which not only is of no value from a testing standpoint but is detrimental to the elements tested.

I have determined that this result is due to the fact that as the movable electrode of the testing apparatus is brought into contact with the mica sheet under test or is moved away from said sheet, the flow of current between the two testing terminals is opposed by the presence of the mica sheet and also by the presence of an air gap, and a brush discharge occurs through the air gap between the mica and the movable terminal which generates an appreciable amount of heat and thus weakens the dielectric strength of the mica. The degree of heat so produced frequently is sufficient to enable the electrical discharge to puncture the thin sheet of mica and thus cause the break-down above described.

It is the chief object of the present invention to improve both the processes and apparatus for testing dielectric materials with a view to overcoming the objections above mentioned, securing greater accuracy in results, and expediting the testing operation. The invention also is directed to improvements in apparatus of this character designed to contribute to the safety and comfort of the operator.

The nature of the invention will be readily understood from the following description when read in connection with the accompanying drawings, and the novel features will be particularly pointed out in the appended claims.

Referring now to the drawings.

Figure 2:
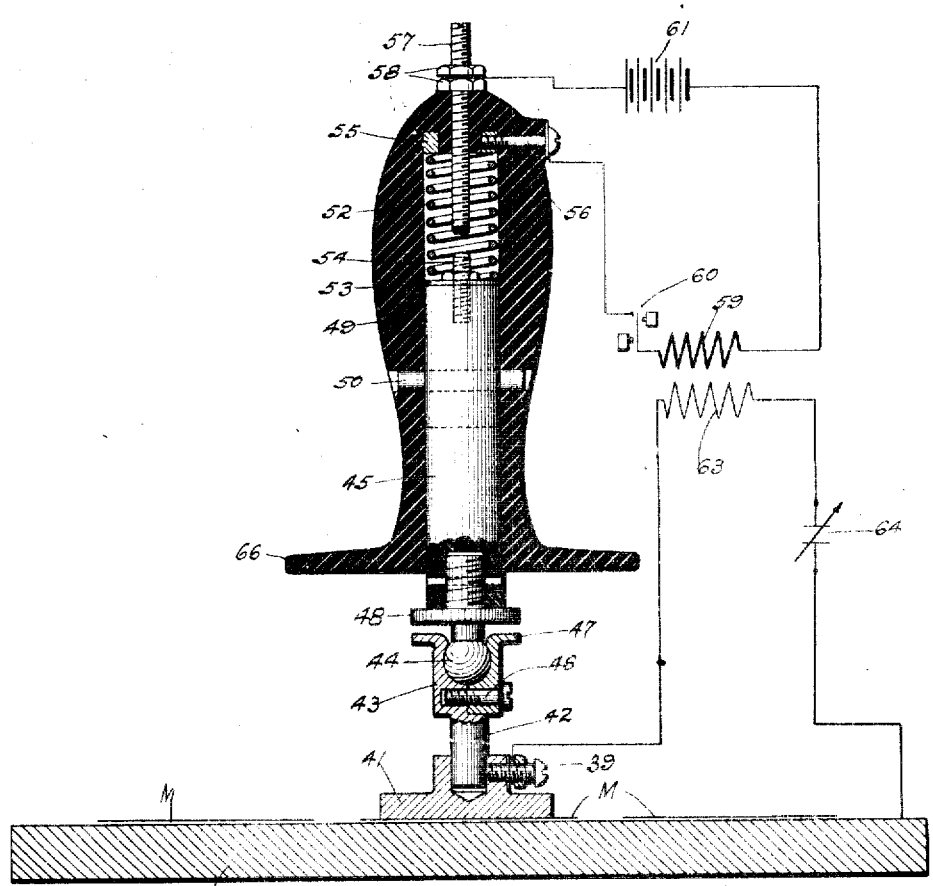

Figure 1 is a perspective view of an apparatus constructed in accordance with the present invention, certain of the elements being indicated diagrammatically; and Fig. 2 is a vertical cross sectional view illustrating another form of apparatus embodying the present invention, certain parts of this apparatus also being indicated diagrammatically.

Referring first to Fig. 1, the apparatus there shown comprises a base 2 of insulating material designed to be secured to a suitable support, such as a bench or table. A stationary metallic plate or terminal 3 is mounted on the forward end of the base 2. Secured to the rearward edge of this base by a hinge 4 is an arm or plate 5 of insulating material, to the under surface of which is secured another metallic contact plate or terminal 6. A groove or recess 7 is cut in the stationary terminal 3 of a proper size to receive the mica sheet M to be tested, this recess thus serving as a convenient means for enabling the operative to place the mica sheet quickly in testing position. The upper contact or testing terminal 6 is of the same shape and dimensions as the active area of the mica sheet to be tested, it being understood that by the "active area" is meant that area subjected to a dielectric strain when the mica element is in use in a condenser. In Fig. 1 the active area of the mica sheet M is the central portion of the sheet enclosed within the broken lines, this area being surrounded by an inactive margin.

The contacts 3 and 6 form the terminals of a high potential testing circuit, and for the purpose of moving the upper terminal into and out of contact with the mica sheet, the plate 5 is connected by means of a link or rod 8 to a lever 9 that is fulcrumed on a standard 10, the lever being connected by a link 11 to a treadle 12 which is hinged at 13 to a base 14. A spring 15 connected at one end to the lower end of the link 8 and at its opposite end to the base 14 normally holds the terminal 6 in contact with the terminal 3. When, however, the forward end of the treadle is depressed, this movement is transmitted through the link 11, lever 9 and rod 8 to the plate 5, thus raising the plate and lifting the contact 6 away from its cooperating contact or terminal 3.

The circuit controlling connections are so arranged that the testing potential is impressed across the terminals 3 and 6 only after they have been relatively moved into firm engagement with the opposite faces of the mica sheet M, and this potential is automatically cut off from the terminals again before they are relatively moved to release the mica sheet. This result is obtained in the construction shown by mounting the controlling switch for the circuits on the treadle 12. That is, the high potential circuit comprises a secondary coil 17 of an induction coil or transformer, this coil being energized from a low potential circuit comprising a primary coil 18, an interrupter 19, a battery or other source of direct current 20, hand switch 21, and a foot switch that comprises two parallel plates 22—22, and a bar 23. Both the plates 22—22 are secured to the treadle 12 while the bar 23 is secured to an insulating plate 24 which is pivoted on the treadle 12 at 25 and normally is held in a raised position by a coiled spring 26 interposed between the plate 24 and a part of the treadle. Suitable conductors connect the two plates 22—22 with the battery 20 and coil 18. A condenser 28 is included in the high potential circuit to limit the current flowing therein, and a visual indication of the current flow is afforded by a volt meter 29 shunted across a variable resistance 30. The resistance 30 may either be connected in the circuit or disconnected by means of a switch 31.

In using this apparatus according to the present process the operator first depresses the treadle 12 to raise the upper contact or terminal 6 into its uppermost position, the switches 21 and 31 being closed. The operator next places a mica sheet or film to be tested in the recess 7 in the stationary terminal 3, as indicated at M, Fig. 1. The switch 22—23 at this time is held open due to the fact that the plate 24 is held in its depressed position by the operator's foot, and consequently, the terminals 3 and 6 are dead at this time. The operator next relieves the pressure on the treadle 12, thus permitting the strong spring 15 to lower the terminal 6 into engagement with the mica sheet M, and when this movement has been completed the operator removes his foot from, or further relieves pressure on, the hinged plate 24, thus enabling the light spring 26 to raise the bar 23 into engagement with the contacts 22—22 to close the primary circuit. The high potential circuit is immediately energized and the testing potenial consequently is impressed across the terminals 3 and 6, thus applying the desired dielectric strain to the mica film M.

If the mica sheet successfully withstands the test the operator will observe that no movement of the needle of the volt meter 29 occurs. Usually, however, the testing potential is sufficient to jump across the inactive margin to the adjacent walls of the recess in the metallic terminal 3, and the operator upon seeing this electrical discharge around the margin of the mica sheet will know that the sheet is good. If, however, the sheet breaks down during the test, no electrical discharge will be seen around the margin of the sheet and the operator thus will know that the sheet is defective. If the volt meter 29 is used, the flow of current through the high potential circuit caused by the breaking down of the element under test will produce a movement of the volt meter needle which will indicate to the operator that the sheet is imperfect.

Usually the volt meter is not used but the operator watches the electrical discharge that takes place and determines in this manner whether or not the mica sheet is defective. The act of watching this discharge is trying to the eyes, and for the purpose of relieving this strain a sheet 32 of some translucent material having suitable protective characteristics preferably is secured to the upper surface of the arm 5 and projects at the front and sides beyond the contact 6, so that the operator sees the discharge through this translucent material. This sheet may consist of any one of a variety of materials, such as amber colored glass or celluloid, lead glass, or the like.

When the test has been completed the operator again depresses the treadle and the first effect of this depressing movement is to force the hinged plate 24 downwardly against the action of the light spring 26, thus moving the bar 23 out of contact with the contacts 22—22, breaking the primary circuit, and consequently deenergizing the high potential circuit. This action takes place before the depressing movement of the treadle 12 is begun, and consequently the testing potential is cut off from the terminals 3 and 6 before the upper terminal is raised out of contact with the mica film M. It will thus be observed that the testing potential is applied to the mica film only after the terminals are relatively moved into firm contact therewith and that it is cut off from these terminals again before they are relatively moved to release the film. Any possibility of the presence of an air dielectric between the mica film and one of the testing terminals therefore is avoided. Not only does this give a far more reliable test of the dielectric strength of the sheet materials being tested, but the fact that the testing terminals are brought into engagement with the mica sheet by means of a spring ensures the application of uniform pressure to each sheet that is tested and thus contributes to greater accuracy in results. A further advantage of this construction is that it protects the operator from injury since the testing terminals are dead at all times when the operator has any occasion to touch them.

Another apparatus embodying certain features of the present invention, and with which the process of the present invention can be conveniently practised, is illustrated in Fig. 2. This apparatus comprises a metallic table or plate 40 on which the mica films M are placed and which forms one terminal of the testing circuit. The other terminal 41 has a plane face of the size and shape of the active area of one of the mica sheets to be tested and it forms part of a hand implement. This terminal is secured by a screw 39 to the lower end of a stud 42 at the upper end of which is formed a split socket 43 to receive a ball end 44 secured in the lower end of a plunger 45. The two parts of the socket 43 are secured together by a screw 46 and this socket is provided with a flaring portion 47 to engage a washer 48 on the lower end of the plunger 45 and thus limit the universal movement provided by the ball and socket joint.

The plunger 45 is mounted to slide freely in a handle 49, this sliding movement being limited by a pin 50 that projects through a slot in the plunger 45. Normally the plunger 45 is held at the lower limit of its movement relatively to the handle by means of a spring 52 which bears on the upper end of the plunger.

This spring and the relative movement between the plunger and handle are utilized to control the primary circuit. For this purpose the spring 52 bears at its lower end on a metallic washer 53 that is secured on the upper end of the plunger by a nut on a screw 54 which is threaded into the plunger. The upper end of this spring bears on a metallic collar 55 which is set into the upper end of the socket in which the plunger is mounted, and a terminal screw 56 projecting through one side of the handle is threaded into this collar. A screw 57 is threaded axially into the upper end of the handle in alinement with the screw 54, the adjacent ends of these two members being normally separated by a substantial gap, and a pair of nuts 58 threaded on the screw 57 hold it in adjusted position and also to operate with it to form a binding terminal The primary circuit of this apparatus comprises a primary coil 59, an interrupter 60, a battery or other source of direct current 61, and conductors that connect these elements in series with each other and with the switch 54—57, as clearly shown in Fig. 2. The flow of current through the switch is form the screw 57 to the screw 54, washer 53, spring 52, collar 55, and terminal screw 56.

The secondary circuit comprises a secondary coil 63, the terminals of which are connected, respectively, to the table 40 and screw 39, and adjustable reactance 64 being included in this circuit to limit the current flowing therethrough.

In using this apparatus the mica films to be tested are laid on the metallic plate 40 in spaced relationship. The operator then grasps the handle 49 and places the terminal 41 on the central portion of one of the mica sheets and presses downwardly on the handle. This pressure compresses the spring 52, closing the switch 54—57, thus energizing the secondary circuit and impressing the testing potential across the mica sheet. If the operator sees a discharge from the terminal 41 around the edge of the mica sheet he knows that the sheet is good, whereas if such a discharge is absent he knows that the sheet is defective. As soon as the pressure on the handle 49 is released the spring 52 opens the switch 54—57 thus breaking the primary circuit and therefore deenergizing the secondary circuit. The operator then repeats this operation on the other mica sheets and discards those that are defective.

The testing operation can be performed very rapidly with this apparatus. The connection of the terminal 41 to the handle through a ball and socket joint is of advantage in ensuring a good contact between this terminal and the mica sheet notwithstanding minor variations in the angular position of the handle with reference to the plate 40. This apparatus also has the same advantage as that of the apparatus above described in applying the testing potential to the mica film only after the film is firmly held between the testing terminals, and of cutting off this potential again before the film is released by the terminals.

The handle 49 preferably is provided with a disk-like extension 66 at its lower end to prevent the operator's hand from sliding down accidentally into contact with the movable terminal 41 or the parts electrically connected thereto.

While I have herein shown and described the best embodiments of the invention of which I am at present aware, it will be understood by those skilled in this art that the invention may be embodied in many other forms of apparatus without departing from the spirit or scope of this invention, and that the process herein disclosed is independent of any specific apparatus but may be practised with the aid of a great variety of forms of apparatus. It will also be understood that while I have herein referred to mica as the specific dielectric material to be tested, since the necessity of performing this testing operation arises particularly where mica is to be used, neither the process nor apparatus herein disclosed are limited to the testing of mica but other dielectric materials are the equivalent of mica so far as this invention is concerned.

What is claimed as new is:

1. A mica testing apparatus comprising, in combination, relatively movable terminals for engaging opposite faces of a sheet of mica, a high potential circuit connected with said terminals, a treadle connected with said terminals, for relatively moving them, a spring connected with said treadle for holding it at one limit of its movement, a switch controlling said circuit and mounted on said treadle, and a spring normally holding said switch in a predetermined condition.

2. A mica testing apparatus comprising, in combination, relatively movable terminals for engaging opposite faces of a sheet of mica, a high potential circuit connected with said terminals, a treadle connected with said terminals for relatively moving them, a spring connected to said treadle tending to hold said terminals in their mica engaging position, a switch mounted on said treadle and controlling said high potential circuit, and a spring normally holding said switch closed.

3. A testing apparatus comprising, in combination, a pair of terminals adapted to engage the opposite faces of a sheet of dielectric, one of said terminals having a dimension less than the corresponding dimension of the sheet providing a margin on the sheet separating the terminals from each other, means for impressing a high potential on said terminals across said dielectric of an order to cause brushing around the margin when the sheet is good and a translucent member mounted between the observer and the location of brushing through which said brushing may be observed.

4. A testing apparatus comprising, in combination, relatively movable metal blocks forming terminals connected to a source of high potential, one of said blocks having an area less than that of the other and the larger block being provided with a recess formed therein to receive said sheet, the smaller block having an area less than that of the sheet and recess.

5. The herein-described method of testing a sheet of insulation which consists in applying a high potential through the sheet upon the central portion thereof only, of such an order as to cause brushing over the margin when the sheet is perfect, and then observing the presence or absence of such brushing to separate the perfect from the imperfect sheets.

6. The herein-described method of testing a sheet of dielectric which consists in subjecting the intermediate portions only of the sheet to a potential of an order to cause brushing over the margin of the sheet when the latter is perfect, observing the presence or absence of said brushing to separate the bad sheets from the good, said potential being applied to the sheet only when the terminals for applying the potential are in engagement with the sheet.

7. The herein-described method of testing a sheet of dielectric which consists in placing terminals in engagement with the opposite sides of the sheet with at least one of the terminals spaced inwardly from the edges of the sheet, and then applying potential to the terminals and upon the intermediate portion of the sheet only while said portion of the sheet is engaged by the terminals.

In testimony whereof I have signed my name to this specification.

BYRON MACPHERSON.